US 11,433,307 B2

United States Patent
Tamura (10) Patent No.: US 11,433,307 B2
(45) Date of Patent: Sep. 6, 2022

(54) SHOOTING GAME IN THREE-QUARTERS VIEW

(71) Applicant: GREE, INC., Tokyo (JP)

(72) Inventor: Makiko Tamura, Tokyo (JP)

(73) Assignee: GREE, INC., Tokyo (JP)

( * ) Notice: Subject to any disclaimer, the term of this patent is extended or adjusted under 35 U.S.C. 154(b) by 94 days.

(21) Appl. No.: 16/922,400

(22) Filed: Jul. 7, 2020

(65) Prior Publication Data

US 2020/0330871 A1    Oct. 22, 2020

Related U.S. Application Data

(63) Continuation of application No. 16/549,455, filed on Aug. 23, 2019, now Pat. No. 10,751,625, which is a
(Continued)

(30) Foreign Application Priority Data

May 30, 2014    (JP) .................................. 2014-112357

(51) Int. Cl.
*A63F 13/57*    (2014.01)
*A63F 13/58*    (2014.01)
(Continued)

(52) U.S. Cl.
CPC .............. *A63F 13/57* (2014.09); *A63F 13/58* (2014.09); *A63F 13/2145* (2014.09); *A63F 13/537* (2014.09)

(58) Field of Classification Search
CPC .................................. A63F 13/57; A63F 13/58
See application file for complete search history.

(56) References Cited

U.S. PATENT DOCUMENTS

| | | |
|---|---|---|
| 8,079,594 B1 | 12/2011 | Greenawalt |
| 8,926,428 B1 | 1/2015 | Nakayama |
| 9,463,381 B2 | 10/2016 | Miki |

FOREIGN PATENT DOCUMENTS

| | | |
|---|---|---|
| JP | 2000-024306 A | 1/2000 |
| JP | 5456934 B1 | 4/2014 |

OTHER PUBLICATIONS

Bloons Tower Defense 5 [released on Dec. 11, 2011] evidenced by Bloons Tower Defense 5 YouTube video [https://gaming.youtube.com/watch?v=e-4YPixOQtM, screen shots in screenMonkeyApprenticeBTD5.pdf], also by Bloons Tower Defense Wiki page [Bloons Tower Defense—Wikipedia, the free encyclopedia.pdf] (Year: 2011).*

(Continued)

*Primary Examiner* — Yingchuan Zhang
(74) *Attorney, Agent, or Firm* — Oblon, McClelland, Maier & Neustadt, L.L.P.

(57)    ABSTRACT

A non-transitory computer-readable storage medium that stores a game program causing a computer to execute functions includes moving each of a game medium in a game field including a plurality of regions, along respective paths set in accordance with a movable path and a moving speed set in the game medium associated with a first player and an attribute of the region; displaying a selection object so that the selection object is shown in at least one of the plurality of regions according to an operation by a second player; changing an attribute of a region in which the selection object is shown and an attribute of regions contained in an influence range set in the selection object; and moving, when the attribute of the region in which the selection object is shown is changed, the game medium (Continued)

according to the attribute of the region in which the selection object is shown, the movable path and the moving speed set in the game medium.

13 Claims, 6 Drawing Sheets

Related U.S. Application Data continuation of application No. 15/786,802, filed on Oct. 18, 2017, now Pat. No. 10,441,889, which is a continuation of application No. 14/724,988, filed on May 29, 2015, now Pat. No. 9,821,229.

(51) Int. Cl.
*A63F 13/537* (2014.01)
*A63F 13/2145* (2014.01)

(56) References Cited

OTHER PUBLICATIONS

Japanese Notice of Reasons for Rejection dated Aug. 19, 2014 with English translation from corresponding Japanese Patent Application No. 2014-112357.
Japanese Decision of Rejection dated Dec. 9, 2014 w/English translation from corresponding Japanese Patent Application No. 2014-112357.
Japanese Content of Pre-Appeal Examination Repot dated May 14, 2015 with English translation from Appeal No. Fufuku 2015-003825 of corresponding Japanese Patent Application No. 2014-112357.
Japanese Notice of Reasons for Rejection dated May 26, 2015 with English translation from corresponding Japanese Patent Application No. 2014-038179.
Toshism, [iPad] Kingdom Rush™: "The Best Tower Defense Game Ever Played!" *AppBank*, Feb. 9, 2012, URL: http://www.appbank.net/2012/02/09/ipad/364608.php, (12 sheets) along with English translation (3 pages).
Kingdom Rush, iPhone AC Exception Report, Feb. 16, 2013, URL:http://iphoneac-blog.com/archives/7739831.html, (8 sheets) with brief English description (2 pages).
"Angry Birds," *Rovio Entertainment Ltd.*, URL: www.angrybirds.jp/ab_game/angry-birds/, (2 sheets) with English translation.
"Fieldrunners 2 Walkthroughs, iPhone/iPod Touch Application Capture," Jan. 15, 2013, (searched on Dec. 3, 2014), URL: http://web.archive.org/web/201301151_61031/http://iphoneac.com/fieldrunners200.html, (12 sheets) with brief English Translation (2 pages).
"Tower Defense, iPhone AC Exception Report," Apr. 28, 2012, (searched on Dec. 3, 2014), URL: http://iphonac-blog.com/archives/cat_60857.html?p=5, (26 sheets) with brief English translation (6 pages).
"Sheep vs. Aliends. Introduce "Tower Madness 2," Tower Defense Game for Smartphone, (Almost) Daily Smartphone Information" No. 522, 4Gamer.net, Aetas, Apr. 18, 2014, (searched on Dec. 3, 2014), URL: http//www.4gamer.net/games/254/G025400/20140417019/ (5 sheets) with brief English description (2 pages).
"Protect the Realm by Arranging and Controlling Defense Units: Dungeon Defender, Free Flash Game," May 19, 2008, (searched on May 13, 2015), URL: http://blog.livedoor.ip/lkreig/archives/65082673.html, (8 sheets) with brief English description (1 page).
Ultimate Defense 2, Defense Game Collection, Aug. 6, 2013, (searched on May 13, 2015), URL: http://web.archive.org/web/20130806191850/http://defensegame.jp/details/18 (2 sheets) with English translation (2 pages).
Stratosphere: Multiplayer Defense, Taking TD game to Whole New Level through its Revolutionary PvP Style, Swipe, Sep. 11, 2013, (searched on May 13, 2015), URL: : http://www.swipe.jp/stratoshpere-multiplayer-defense/review/ (22 sheets) with Brief English description (2 pages).
"Metamorphosis" Excites Man's Spirits Most! Thrilled with Tower Offense "Anomaly 2," Famitsu App. Enterbrain, Nov. 16, 2013, (searched on May 13, 2015), URL: http://app.famitsu.com/20131118_267290/ (5 sheets) with brief English Description (1 page).
"Tower Offense Game Made from a Different Angle "Anomaly Warzone Eath" Impression," Famitsu.com, Apr. 7, 2012, (searched on May 14, 2015), URL: http://www.famitsu.com/news/201204/07012722.htm (5 sheets) with English translation (4 pages).
Notice of Reasons for Rejection dated Mar. 4, 2016 of corresponding Japanese Application No. 2014-1123 57 with English translation.
Superjombombo2, "Individual Towers Monkey Apprentice EI2 YouTube video," published on Sep. 29, 2012, available at https://gaming.youtube.com/watch?v=e-4YPixOOM, last accessed on Sep. 22, 2016.
Wikipedia, "Bloons Tower Defense—Wikipedia, the free encyclopedia.pdf," published on Jan. 27, 2012.
Dave Tach, "Stratosphere_Multiplayer Defense turns an iPad into a tower defense board game—Polygon.pdf," published on Feb. 8, 2013, available at http://www.polygon.com/2013/2/8/3968076,stratosphere-multiplayer-defense-trailer, last accessed on Sep. 22, 2016.

\* cited by examiner

SHOOTING GAME IN THREE-QUARTERS VIEW

CROSS-REFERENCE TO RELATED APPLICATIONS

This application is a continuation of U.S. application Ser. No. 16/549,455, filed on Sep. 23, 2019, which is a continuation of U.S. application Ser. No. 15/786,802, filed on Oct. 18, 2017, which is a continuation of U.S. application Ser. No. 14/724,988, filed on May 29, 2015, which claims priority to Japanese Patent Application Number 2014-112357, filed on May 30, 2014. The entire contents of each of which are incorporated herein by reference.

TECHNICAL FIELD

This disclosure relates to a non-transitory computer-readable storage medium that stores a game program that processes the progress of a game using plural game mediums.

BACKGROUND

As electronic devices such as smart-phones or tablet terminals have become widespread, games for these electronic devices (in addition to home game machines) have been actively developed. For example, in one conventional game an object owned by a player flies out towards enemy characters in a game field according to a flick operation of the player with respect to an input surface. Progress of the game is processed according to an arrangement position of the object.

However, in the conventional game, since the game progresses according to the arrangement position of the object, the player only arranges the object aimed at a predetermined position. Thus, variations relating to the arrangement position of the object are small, and strategic flexibility is insufficient.

SUMMARY

We thus provide:

A non-transitory computer-readable storage medium that stores a game program capable of realizing a game with high amusement and strategic flexibility in which movements of characters in a game field are indirectly operated by an object flied/flung out by a player.

A non-transitory computer-readable storage medium stores a game program that processes the progress of a game using a plurality of game mediums. The game program causes a computer to execute: moving each of the game mediums along a predetermined path in a game field including a plurality of regions; first displaying a selection object capable of selecting at least one of the plurality of regions so that the selection object flies out according to an operation detected by a certain input unit; and changing, when one of the plurality of regions is selected by the selection object, an attribute set in the region to change the predetermined path where the game medium moves.

The "game medium" refers to arbitrary electronic data (for example, a character or an item) used by the player in the game. Similarly, the "selection object" refers to arbitrary electronic data (for example, armor piercing ammunition) used by the player in the game.

The "game field" refers to a virtual space where the player arranges the game mediums in the game, in order to progress the game. The "attribute" refers to information (for example, topography) relating to actions of the game medium (for example, a movement of the game medium) in each region included in the game field.

The game program in the non-transitory computer-readable storage medium may cause the computer to further execute: retrieving at least one of a flying out strength, a flying out direction and a flying out angle of the selection object based on the operation. The first displaying may include displaying the selection object so that the selection object flies out into the game field while drawing a locus determined according to at least one of the retrieved flying out strength, the flying out direction and the flying out angle.

The game field in the non-transitory computer-readable storage medium may be a three-dimensional game field having a width, a depth and a height. The game program may cause the computer to further execute: second displaying of the game field looked down on from a predetermined angle.

In the non-transitory computer-readable storage medium, at least one of a moving direction, a movable distance and a moving speed may be set in each of the plurality of game mediums. The moving may include moving each of the game mediums based on at least one of the moving direction, the movable distance and the moving speed.

In the non-transitory computer-readable storage medium, the attribute may at least include an inhibiting attribute for inhibiting the movement of the game medium or a promoting attribute for promoting the movement of the game medium. The changing may include changing the predetermined path by changing the attribute set in the region into the inhibiting attribute or the promoting attribute.

In the non-transitory computer-readable storage medium, the plurality of game mediums may be characters operated by the player, and an opponent player or the computer that fights with the player, respectively.

In the non-transitory computer-readable storage medium, a purpose of the game may be to occupy a predetermined position in the game field that is protected by an opponent player, by game mediums capable of being operated by the player.

A method of controlling a computer is provided that processes the progress of a game using a plurality of game mediums. The method includes: moving each of the game mediums along a predetermined path in a game field including a plurality of regions; first displaying a selection object capable of selecting at least one of the plurality of regions so that the selection object flies out according to an operation detected by a certain input unit; and changing, when one of the plurality of regions is selected by the selection object, the predetermined path where the game medium moves.

The method may further include: retrieving at least one of a flying out strength, a flying out direction, and a flying out angle of the selection object based on the operation, in which the first displaying includes displaying the selection object so that the selection object flies out into the game field while drawing a locus determined according to at least one of the retrieved flying out strength, the flying out direction and the flying out angle.

In the method, the game field may be a three-dimensional game field having a width, a depth and a height. The method may further include: second displaying of the game field looked down on from a predetermined angle.

In the method, at least one of a moving direction, a movable distance and a moving speed may be set in each of the plurality of game mediums. The moving may include moving each of the game mediums based on at least one of the moving direction, the movable distance and the moving speed.

In the method, the attribute may include at least an inhibiting attribute for inhibiting the movement of the game medium or a promoting attribute for promoting the movement of the game medium. The changing may include changing the predetermined path by changing the attribute set in the region into the inhibiting attribute or the promoting attribute.

In the method, the plurality of game mediums may be characters operated by the player, an opponent player or the computer that fights with the player, respectively.

In the method, a purpose of the game may include occupying a predetermined position in the game field that is protected by an opponent player, by a game medium capable of being operated by the player.

A computer is provided that processes the progress of a game using a plurality of game mediums. The computer includes: a moving section that moves each of the game mediums along a predetermined path in a game field including a plurality of regions; a first display section that displays a selection object capable of selecting at least one of the plurality of regions so that the selection object flies out according to an operation detected by a certain input unit; and a change section that changes, when one of the plurality of regions is selected by the selection object, the predetermined path where the game medium moves.

The computer may further include: a retrieving section that retrieves at least one of a flying out strength, a flying out direction, and a flying out angle of the selection object based on the operation. The first display section may display the selection object so that the selection object flies out into the game field while drawing a locus determined according to at least one of the retrieved flying out strength, the flying out direction and the flying out angle.

In the computer, the game field may be a three-dimensional game field having a width, a depth and a height. The computer may further include: a second display section that displays the game field looked down on from a predetermined angle.

In the computer, at least one of a moving direction, a movable distance and a moving speed may be set in each of the plurality of game mediums. The moving section may move each of the game mediums based on at least one of the moving direction, the movable distance and the moving speed.

In the computer, the attribute may at least include an inhibiting attribute for inhibiting the movement of the game medium or a promoting attribute for promoting the movement of the game medium. The change section may change the predetermined path by changing the attribute set in the region into the inhibiting attribute or the promoting attribute.

In the computer, the plurality of game mediums may be characters operated by the player, and an opponent player or the computer that fights with the player, respectively.

According to the non-transitory computer-readable storage medium, the control method of the computer, and the computer, it is possible to change a predetermined path where the game medium moves, by flying out the selection object, capable of selecting at least one of the plural regions included in the game field, to change the attribute set in the region. That is, according to the non-transitory computer-readable storage medium and the like, it is possible to indirectly operate the movement of the game medium in the game field by the object flied/flung out by the player.

Accordingly, the game program or the like are capable of realizing a game with high amusement and strategy.

DESCRIPTION OF REFERENCE SIGNS 1 locus
6 selection object
7a character (game medium)
7b enemy character (game medium)
11 input retrieving section (retrieving function)
12 object display section (first display function, first display section)
13 attribute change section (change function, change section)
14 field display section (second display function)
15 character moving section (movement function, moving section)
40 input unit
100 mobile terminal (computer)
L game field
l region

DETAILED DESCRIPTION

Examples of storage media, a control method and a computer will be described with reference to FIGS. 1 to 6.
Outline of Mobile Terminal 100

Figure 1:
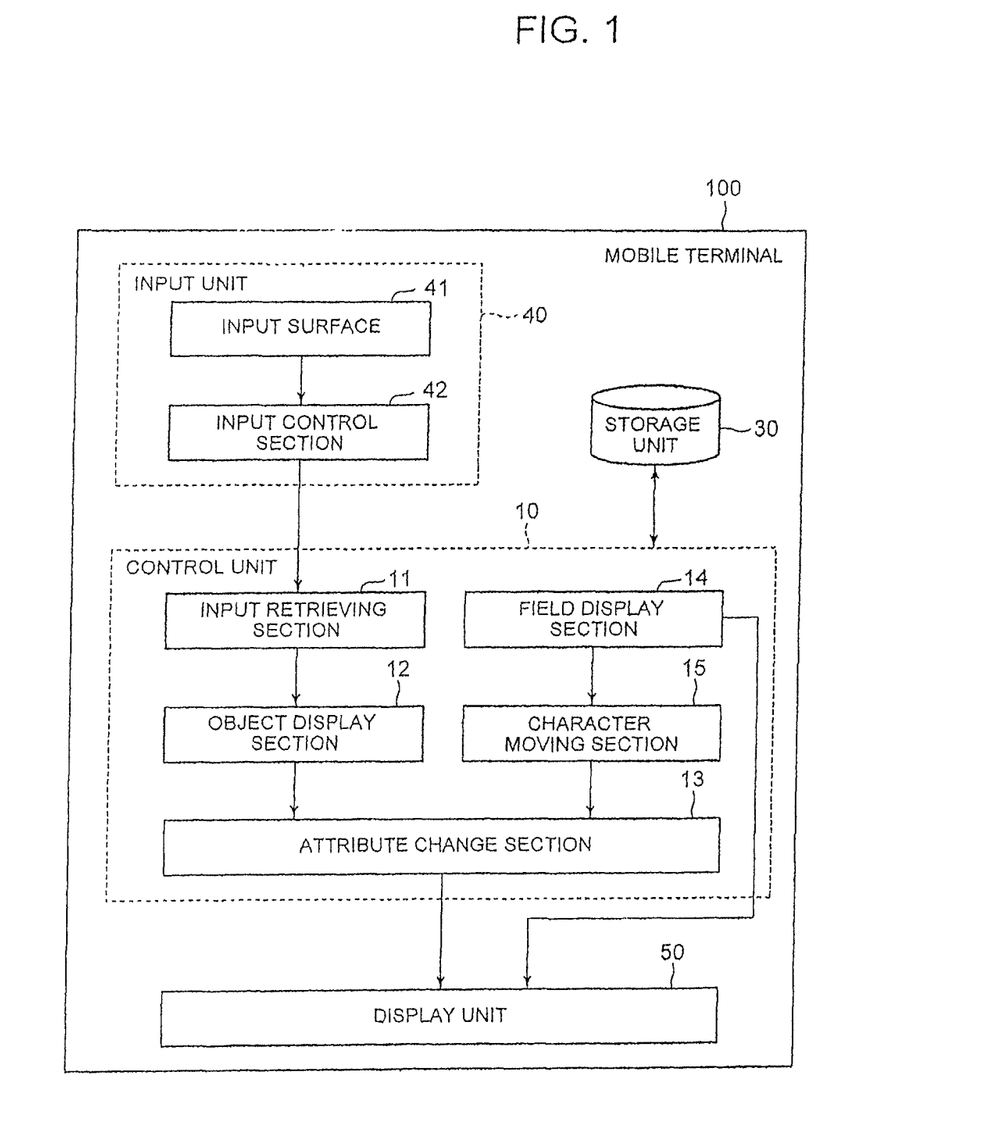
FIG. 1 is a block diagram illustrating a main configuration of a mobile terminal according to an example.
Figure 2:
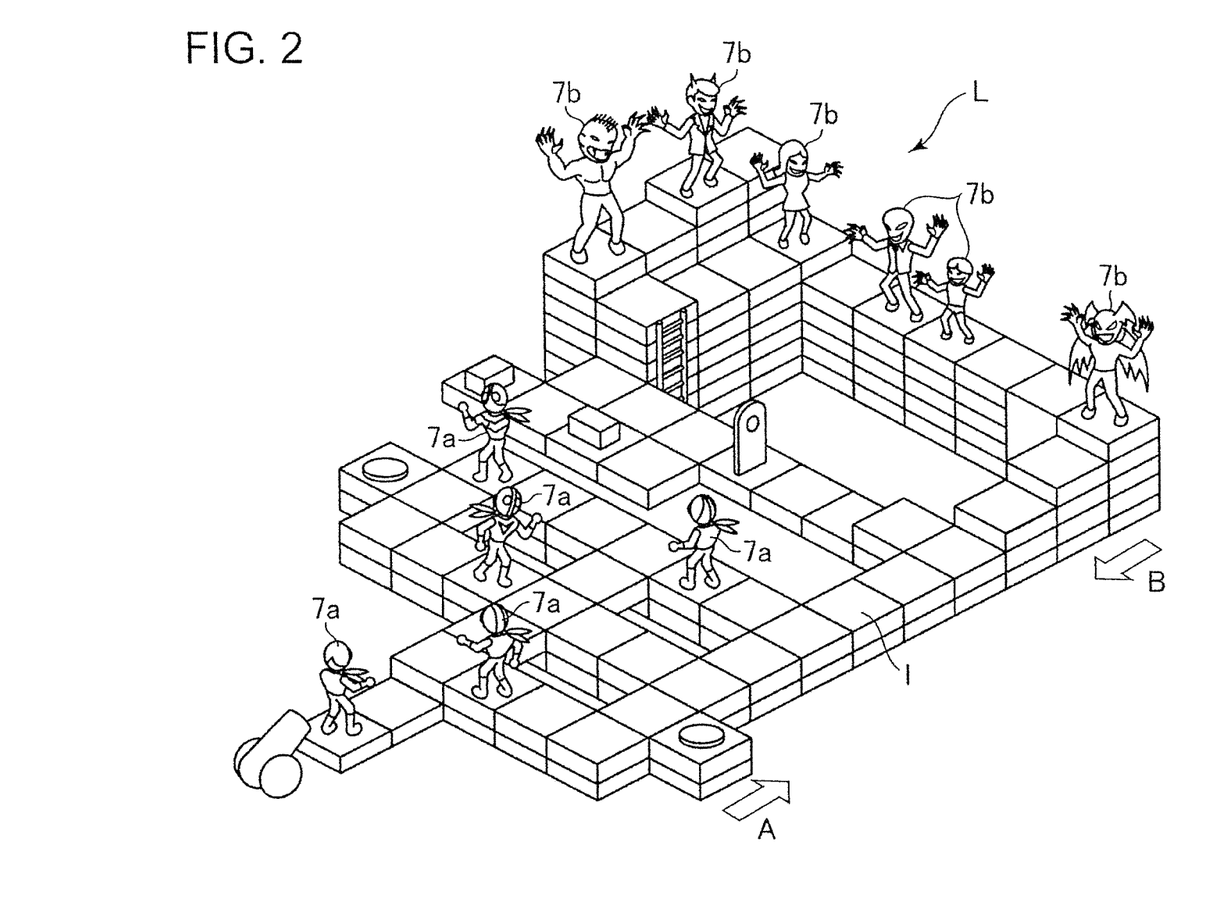
FIG. 2 is a schematic view illustrating an example of a game screen displayed in a display unit included in the mobile terminal.

FIG. 2 is a schematic view illustrating an example of a game screen displayed in a display unit provided in a mobile terminal 100 (FIG. 1). The mobile terminal (computer) 100 is a computer that processes the progress of a game using plural game mediums (for example, characters 7 respectively operated by a player, and an opponent player or a computer that fights with the player). The mobile terminal 100 may be a device capable of executing processes to be described hereinafter, for example, a smart-phone, a tablet terminal, a mobile phone, a home game machine, a personal computer, or other electronic devices.

In this example, it is assumed that the "game" means a battle game having a purpose of occupying a predetermined position in a game field L protected by the opponent player by a character (game mediums) capable of being operated by the player (other purpose examples will be described in detail in "winning conditions of game"). However, the "game" is not limited to the battle game (opposing game) and generally includes, for example, a cooperation game, a combat game, a communication game, and other games.

As illustrated in FIG. 2, a player or an opponent player respectively arranges ally characters 7a capable of being operated by the player and enemy characters 7b capable of being operated by the opponent player in a region l included in a game field L. The player and the opponent player may arrange all characters 7 (the ally characters 7a and the enemy characters 7b are collectively referred to as the characters 7) when a game starts, or may sequentially arrange the characters 7 according to the progress of the game.

The characters 7 move in a predetermined direction. In the example shown in FIG. 2, the ally character 7a move in a direction A (that is, in a direction where the enemy characters 7b take up their positions), and the enemy characters 7b move in a direction B (that is, in a direction where the ally characters 7a take up their positions).

Then, the player selects one (not shown in FIG. 2, see FIGS. 3 and 4) among plural selection objects 6 to be flied/flung out into the game field L. The player performs a predetermined touch operation (an operation of bringing a finger or an indicator into contact with or close to the touch panel to give an input to the mobile terminal 100), to set a flying out strength, a flying out direction and/or a flying out angle of the selection object 6, and flies/flings out the selection object 6 aimed at a region l that is a selection target.

When the region l is selected by the selection object 6, an attribute corresponding to the region l is changed according to a parameter corresponding to the selection object 6 and/or the attribute. Further, the characters 7 respectively change their moving paths according to the change (for example, a change such that the region l cannot be passed by the change of the attribute).

When any ally character 7a reaches a predetermined region protected by the opponent player, the mobile terminal 100 determines that the player wins the battle game, and terminates the battle game. On the other hand, when any enemy character 7b reaches a predetermined region to be protected by the player, the mobile terminal 100 determines that the player was defeated in the battle game, and terminates the battle game.

As described above, the mobile terminal 100 may fly out the selection object 6, may change the attribute set in the region l, and may change the predetermined moving paths of the characters 7, according to an operation of the player. For example, when a path A and a path B are present (when plural paths are present) and the ally character 7a is advancing on the path A as a path from a certain region to another region, the player may change the attribute to thereby change the path A to the path B.

That is, the mobile terminal 100 may indirectly operate the movement of the characters 7 in the game field L by the selection object 6. Thus, the mobile terminal 100 can realize a game with high amusement and strategic flexibility.

Configuration of Mobile Terminal 100

FIG. 1 is a block diagram illustrating a main configuration of the mobile terminal 100. As shown in FIG. 1, the mobile terminal 100 includes a control unit 10 (an input retrieving section 11, an object display section 12, an attribute change section 13, a field display section 14, and a character moving section 15), an input unit 40 (an input surface 41 and an input control section 42), a display unit 50, and a storage unit 30.

The control unit 10 generally controls various functions of the mobile terminal 100. The control unit 10 includes the input retrieving section 11, the object display section 12, the attribute change section 13, the field display section 14, and the character moving section 15.

The input retrieving section (retrieving function) 11 retrieves at least one of a flying out strength, a flying out direction and a flying out angle of the selection object 6 based on a touch operation (an operation detected by a certain input unit) with respect to the input surface 41. The input retrieving section 11 outputs the retrieved information (strength, direction, and angle) relating to the flying out of the selection object 6 to the object display section 12.

The object display section (first display function, first display section) 12 displays the selection object 6 in the display unit 50 (predetermined display unit) so that the selection object 6 (capable of selecting at least one of the plural regions included in the game field) flies out according to a touch operation detected by the input surface 41. The object display section 12 may display the selection object 6 in the display unit 50 so that the selection object 6 flies out into the game field L while drawing a locus. The locus may be determined according to at least one of the strength, direction, and angle retrieved by the input retrieving section 11.

When one region of the plural regions is selected by the selection object 6, the attribute change section (change function, change section) 13 changes predetermined moving paths of the characters 7 by changing an attribute set in the region. The attribute is information (for example, topography) relating to actions of the characters 7 (for example, movements of the characters 7) in each region included in the game field L, and at least includes an inhibiting attribute for inhibiting the movements of the characters 7 or a promoting attribute for promoting the movements of the game mediums. The attribute change section 13 may change the attribute set in the region to the inhibiting attribute or the promoting attribute, to thereby change the predetermined paths.

The field display section (second display function) 14 looks down on the game field L from a predetermined angle to be displayed in the display unit 50. For example, as shown in FIGS. 2 to 5, the field display section 14 may display the game field L in a three-quarters view of an angle of 45 degrees. The game field L may be a three-dimensional game field having a width, a depth, and a height.

The character moving section (movement function, moving section) 15 moves the characters 7 along the predetermined paths in the game field L, which is a stage where the game is progressed. In each of the plural characters 7, at least one of a moving direction, a movable distance, and a moving speed is set. The character moving section 15 may move each of the characters 7 based on at least one of the moving direction, the movable distance and the moving speed.

The input unit 40 receives a touch operation from the player. In this example, the input unit 40 may be a touch panel on which a multi-touch can be detected. The input unit 40 includes the input surface 41 and the input control section 42. A method of giving an input to the mobile terminal 100 is not limited to the touch operation using the touch panel (for example, the input may be given by pressing a predetermined input key).

The input surface 41 is a device (for example, a touch surface included in the touch panel) capable of detecting a position designated by the touch operation of the player. The input surface 41 outputs coordinate information corresponding to the designated position to the input control section 42.

The input control section 42 retrieves the coordinate information from the input surface 41 at predetermined time intervals, and outputs a series of the coordinate information to the input retrieving section 11 as a locus.

The display unit 50 is a device that displays a game screen. In this example, the display unit 50 may be a liquid crystal display. In FIG. 1, the input unit 40 and the display unit 50 are shown separately to clarify respective functions thereof. However, for example, when the input unit 40 is a touch panel and the display unit 50 is a liquid crystal display, it is preferable that both the input unit 40 and the display unit 50 be integrally configured.

The storage unit 30 is a storage device configured by an arbitrary recording medium such as a hard disk, a solid state drive (SSD), a semiconductor memory or a DVD, and stores a game program capable of controlling the mobile terminal 100 and data.

Type of Selection Object 6

The selection object 6 may be assigned to a player (1) by a lottery and/or (2) as the player satisfies a predetermined condition (for example, according to a combat result of the player in a predetermined game). The player may have plural selection objects 6 and, in this case, the selection object 6 to be flied/flung out by the player may be arbitrarily selected.

Different parameters (flying distance, offensive power, influence range, accuracy, the number of allowable flying out or the like) may be set in the respective selection objects 6. Thus, the mobile terminal 100 can enhance the strategic flexibility of the game.

For example, when a setting is performed so that the selection object 6 that reaches a long distance has weak offensive power and the selection object 6 that reaches only a short distance has strong offensive power, the player may need a strategy to select the selection object 6 to be flied/flung out and/or the region l to be aimed at, in consideration, for example, of distances to the characters 7 in the game field L and/or moving speeds of the characters 7.

Further, when an influence range varies for each selection object 6, the player may need a strategy to select the selection object 6 and the region l to be aimed at according to the density of the characters 7 in the game field L and/or the area of the region l where the attribute change is necessary. Further, when the number of allowable flying out is set for each selection object 6, the player may need a strategy to fly out the selection object 6 in the region l at an appropriate timing in consideration, for example, of the arrangements of the characters 7 in the field L and/or the number of paths.

When the region l is selected by the selection object 6, the amount of change (variation) of the attribute set in the region l may vary for each selection object 6. For example, the mobile terminal 100 may increase the variation as the selection object 6 becomes stronger. In this case, it is preferable that the mobile terminal 100 reduce the number of allowable flying out of the selection object 6 as the selection object 6 becomes stronger. Thus, the mobile terminal 100 can appropriately maintain the balance of the game.

Further, the mobile terminal 100 may change the variation according to the type of the selection object 6 and the attribute of the region l. For example, when the selection object 6 is "armor piercing ammunition," the mobile terminal 100 may increase the variation with respect to a region having a "wall" attribute (that is, the mobile terminal 100 may be configured so that it is effective to fly out the "armor piercing ammunition" to break the "wall").

Flying Out Selection Object 6

Figure 3:
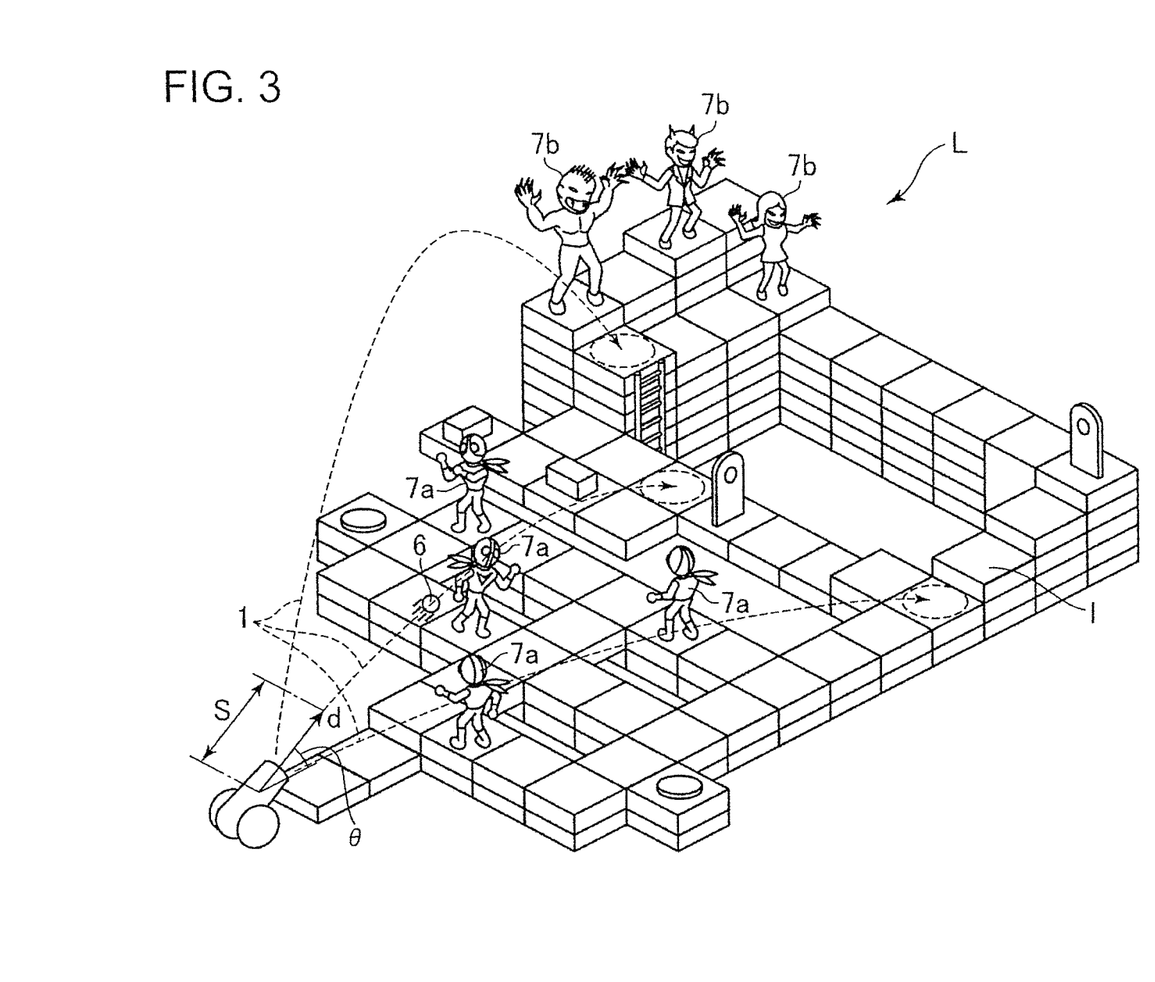
FIG. 3 is a schematic view illustrating an example of a flying out method of a selection object.

FIG. 3 is a schematic view illustrating an example of a method of flying out the selection object 6. As described above, the mobile terminal 100 may display the selection object 6 in the display unit 50 so that the selection object 6 flies out into the game field L, while drawing a locus 1 determined according to at least one of a strength S, a direction d and an angle θ retrieved by the input retrieving section 11. In the example shown in FIG. 3, a "cannon" is displayed as a game medium that flies/flings out the "armor piercing ammunition" which is the selection object 6.

That is, the player may determine a flying out strength, a flying out direction and/or a flying out angle of the selection object 6 by inputting a flick operation having a predetermined angle and a predetermined length to the input surface 41 using the selection object 6 as a starting point. Specifically, the mobile terminal 100 may determine the flying out direction and flying out angle of the selection object 6 from an angle of a locus drawn by the flick operation using the selection object 6 as the starting point, and may determine the flying out strength of the selection object 6 from the length of the locus.

In this case, the player may determine the flying out strength, flying out direction and/or flying out angle of the selection object 6, by inputting a flick operation of drawing a locus (for example, an L-shaped locus) bent through the selection object 6 to the input surface 41. Specifically, the mobile terminal 100 may determine the flying out strength of the selection object 6 from the length of the L-shaped locus in a longitudinal direction, and may determine the flying out direction and flying out angle of the selection object 6 from the length of the L-shaped locus in a transverse direction.

Further, the mobile terminal 100 may fly out the selection object 6 along the locus 1 that is drawn as a parabola to receive the influence of virtual gravity in the game field L (which is acceleration applied in a direction along an axis that represents the height in a three-dimensional space set in the game field L), or may fly out the selection object 6 along a linear locus 1 so not to receive the influence.

Further, the mobile terminal 100 may display (1) a bar that determines at least one of the flying out strength, flying out direction and flying out angle of the selection object 6 and/or (2) an arrow-shaped indication object on a screen. The indication object may be continuously changed in its length and/or direction, and at least one of the flying out strength, flying out direction and flying out angle of the selection object 6 may be determined by the length and/or direction of the indication object, according to a timing of the touch operation by the player.

In addition, the mobile terminal 100 may fly out the selection object 6 from a predetermined region l in the game field L to be protected by the player. For example, when a predetermined end portion of the game field L is selected by the player, the mobile terminal 100 may fly out the selection object 6 from the region l in the selected end portion. Further, the mobile terminal 100 may fly out the selection object 6 from plural regions l included in the game field L and, in this case, the mobile terminal 100 may select and fly out plural different selection objects 6.

Further, the mobile terminal 100 may determine whether a predetermined condition is satisfied. When the predetermined condition is satisfied, the mobile terminal 100 may change the region l into which the selection object 6 can be flied/flung out. For example, the mobile terminal 100 may determine whether a predetermined time has elapsed after the game starts as one of the predetermined conditions. When the predetermined time has elapsed, the mobile terminal 100 may increase the range of the region l to which the selection object 6 can be flied/flung out. Further, the mobile terminal 100 may determine whether the character 7 reaches a predetermined position as one of the predetermined conditions. When the character 7 reaches the predetermined position, the mobile terminal 100 may increase the range of the region l to which the selection object 6 can be flied/flung out. In addition, the mobile terminal 100 may determine the region l into which the selection object 6 can be flied/flung out, according to a position where the character 7 is arranged. Thus, the mobile terminal 100 can request strategic thinking and an appropriate action operation at an appropriate time by the player. Thus, it is possible to achieve a game with high amusement and strategic flexibility.

Characteristic of Character 7

The ally characters 7a may be assigned to the player (1) by a lottery and/or (2) as the player satisfies a predetermined condition (for example, according to a combat result of the player in a predetermined game). The player may have plural types of ally characters 7a and, in this case, the player may arbitrarily select the ally character 7a to be used in the game.

Different parameters (moving speed, moving direction, moving path, offensive power, physical strength and the like) may be set in the characters 7 that move in the game field L so that the mobile terminal 100 may move the characters 7 according to the parameters. Further, the parameters may include state information indicating states of the characters 7 (for example, hit points, magic points, offensive power, defensive power, experience points, physical strength, speed, required ability points, special move, support skill, usage count, survival, death, paralysis, freeze, poison or the like). Thus, the mobile terminal 100 can display the characters 7 with sufficient variation in the game field L and, thus, it is possible to realize a game with high amusement and strategic flexibility.

For example, the player may need a strategy to predict a moving path of the character 7 from a moving speed and/or a moving direction of each character 7 and fly out the selection object 6 into an appropriate region l. Further, when (1) a movable path and/or (2) a preferentially selected path varies for each character 7 (for example, when there are a character 7 capable of moving in water, a character 7 capable of getting over an elevation difference, and a character 7 that preferentially moves in a swamp), the player may, for example, predict various paths, and may need a strategy to fly out the selection object 6.

Further, in the game field L, when the characters 7 are respectively operated by the player and the opponent player or the computer, combat between the ally character 7a and the enemy character 7b may be performed in the game field L. Thus, the mobile terminal 100 can provide a change in the progress of the combat such as a stage of the combat and an increase or decrease of the number of the characters 7 in the combat. Thus, it is possible to realize a game with high amusement and strategic flexibility.

For example, the player may need a strategy to fly out the selection object 6 to increase the moving speed and degree of freedom of path selection with respect to a path where the number of the ally characters 7a is large. Contrarily, the player may need a strategy to fly out the selection object 6 to decrease the moving speed and degree of freedom of path selection with respect to a path where the number of the enemy characters 7b is large.

The mobile terminal 100 may assign an experience value to the selection object 6 and the characters 7 according to the progress of the game. When an accumulated value of the experience values exceeds a predetermined threshold value, the levels of the selection object 6 and/or the characters 7 become high. The mobile terminal 100 may change the parameters of the selection object 6 and/or the characters 7 as the levels of the selection object 6 and/or the characters 7 become high.

Thus, the mobile terminal 100 can assign the amusement of training the selection object 6 and/or the characters 7 to a user. Accordingly, the mobile terminal 100 can provide the user with a feeling of immersion in the game.

The ally characters 7a and/or the selection object 6 may be operated by plural players. For example, the plural selection objects 6 may be respectively operated by plural players, or the selection object 6 and the ally characters 7a may be individually operated by different players. In this case, a first player who operates the characters 7 may inform a second player who operates the selection object 6 of a desired moving path of the ally characters 7a in advance, to thereby make it possible to achieve an unexpected development of the game with respect to the battle player. Accordingly, the mobile terminal 100 can arouse the necessity of cooperation between the players, and can demand a higher level of strategic flexibility of the player. Thus, it is possible to provide a game with high amusement and strategic flexibility.

Change in Attribute of a Region

As described above, when one of plural regions is selected by the selection object 6, the mobile terminal 100 may change the attribute set in the region, to thereby change a predetermined moving path of the character 7.

Figure 4:
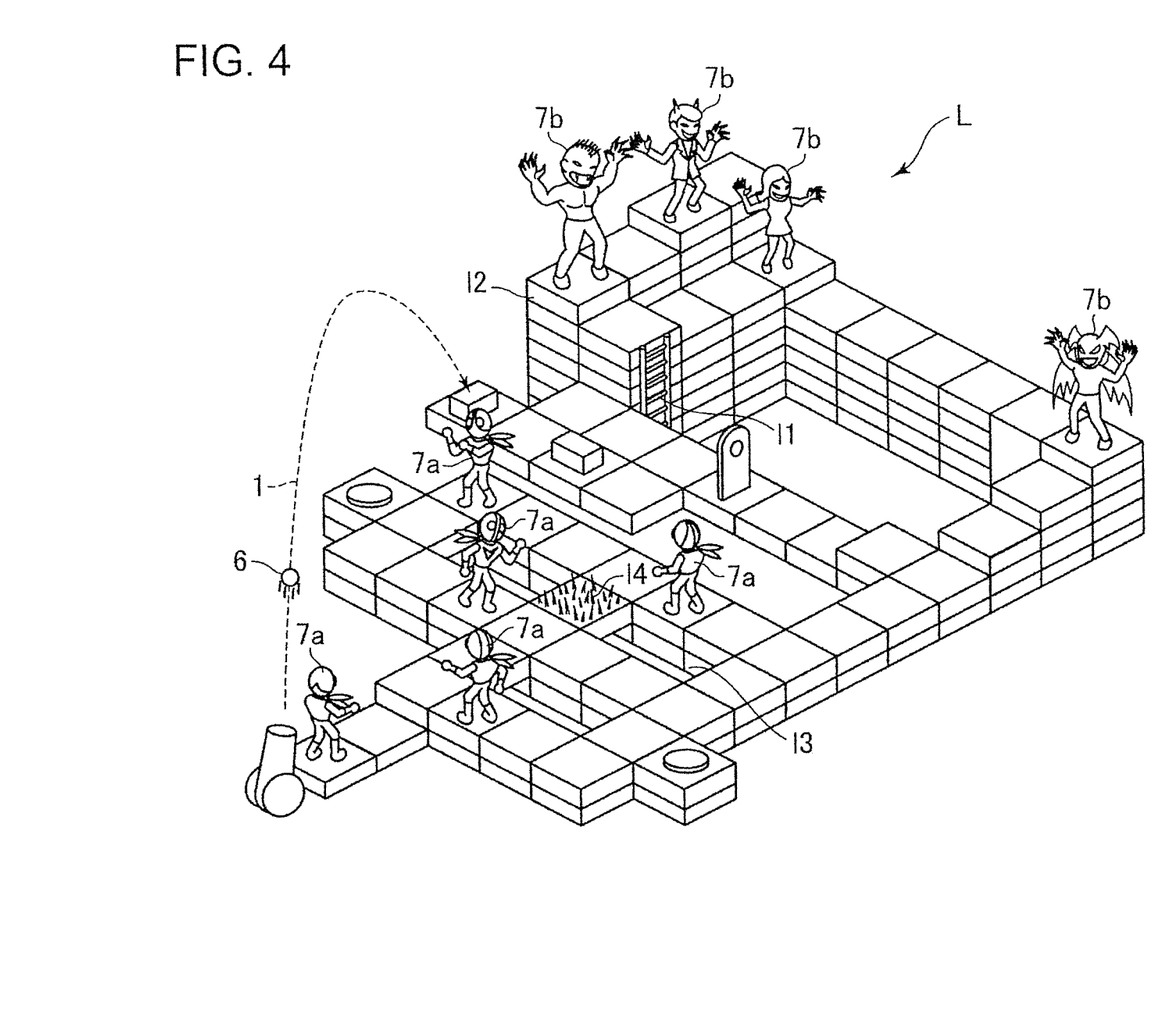
FIG. 4 is a schematic view illustrating an example of a game screen displayed so that a selection object flies out into a game field while drawing a locus.

FIG. 4 is a schematic view illustrating an example of a game screen displayed so that the selection object 6 flies out into the game field L while drawing the locus. Further, FIG. 5 is a schematic view illustrating an example of a game screen in which one region among plural regions is selected by the selection object 6 and an attribute of the selected region is changed as a result.

As illustrated in FIG. 4, by selecting a region by the selection object 6, the player may change the attribute of the region (1) to lean a ladder against a cliff present in the region (see reference numeral 11 in FIG. 4), (2) to pile rocks on the cliff to make it higher (see reference numeral 12 in FIG. 4), or (3) to warp the character 7 from the region to a separate region. Thus, the player may create a path, for example, where the character 7 is able to move in a region with an elevation difference.

Figure 5:
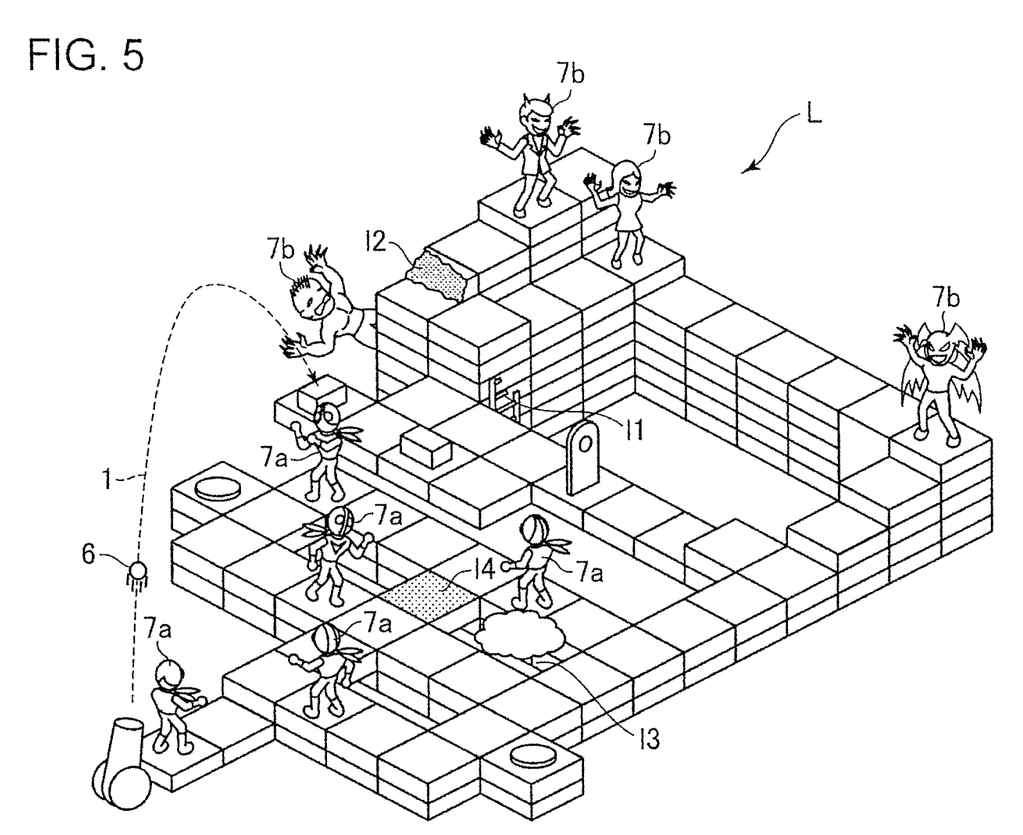
FIG. 5 is a schematic view illustrating an example of a game screen in which one region among plural regions is selected by a selection object, and an attribute of the selected region is changed as a result.

As illustrated in FIG. 5, contrarily, the player may change the attribute of the region to (1) break the ladder (see reference numeral 11 in FIG. 5), (2) destroy the cliff (see reference numeral 12 in FIG. 5), or (3) negate the effect of the warp. Thus, the player may also block the path where the character 7 is able to move in the region with the elevation difference.

Further, by changing the attribute as described above, the player may change the moving paths of the characters 7, and may also change the parameters of the characters 7. For example, by selecting the region by the selection object 6, the player may destroy a bridge that exists in the region on which the enemy character 7b is moving, to damage the enemy character 7b (to reduce the physical strength of the enemy character 7b).

Further, as described above, the attribute may at least include the inhibiting attribute to inhibit the movements of the characters 7 or the promoting attribute that promotes the movements of the characters 7. For example, by selecting the region by the selection object 6, the player may change the attribute of the region (1) to dispose a sticky item in the region, (2) to change the topography of the region into a topography where it takes time for movement (for example, a swamp, valley, mountain or the like) (see reference numeral 13 in FIG. 4), or (3) to create a wasteland (see reference numeral 14 in FIG. 4). Thus, the player may lower the moving speeds of the characters 7.

The effects illustrated in (1) to (3) may also be continuously generated with respect to (a) the character 7 that will pass through the region in the future and/or (b) the character 7 that has passed through the region once or more.

Contrarily, the player may change the attribute of the region (1) to generate floating matter capable of transporting the character 7 on the water or in the air (see reference numeral 13 in FIG. 5), (2) to change the topography of the region into a topography where it does not take time for movement (for example, a flat land or the like), or (3) to level the wasteland (see reference numeral 14 in FIG. 5). Thus, the player may increase the moving speeds of the characters 7.

Further, the mobile terminal 100 may set durability in each region. In this case, if a region is selected by the selection object 6, the mobile terminal 100 accumulates change values of an attribute assigned by the selection, and when the accumulated value exceeds the durability, the mobile terminal 100 changes the attribute of the region. The change value may be determined, for example, based on the offensive power of the selection object 6 and/or the defensive power of the region.

The mobile terminal 100 may arrange an item capable of supporting the character 7 in the game field L. For example, the mobile terminal 100 may arrange (1) a jewel box in which an item that increases the moving speed of the character 7 is stored, (2) an item that recovers the physical strength of the character 7, and/or (3) a coin capable of being exchanged for a predetermined item. Further, when a region is selected by the selection object 6, the mobile terminal 100 may show an item capable of supporting the character 7 in the region. Thus, the mobile terminal 100 can provide a game with sufficient variation to the player.

Further, when one of plural regions is selected by the selection object 6, the mobile terminal 100 may change the attribute set in the region, and also may change state information indicating the state of the character 7 included in the region. For example, when the cliff included in the region is destroyed (see reference numeral 12 in FIG. 5), the mobile terminal 100 may reduce the hit points (physical strength) of the enemy character 7b that stands on the cliff. Alternatively, when the topography of the region is changed into "swamp," the mobile terminal 100 may reduce the moving speed of the enemy character 7b that exists in the "swamp," and may move the enemy character 7b to another region adjacent to the region (which represents that the enemy character 7b comes out of the "swamp"). That is, the mobile terminal 100 may change the state information of the character 7 included in the region selected by the selection object 6 to change a predetermined path where the character 7 moves.

Winning Conditions of the Game

As described above, in this example, in the battle game, the purpose of the mobile terminal 100 is to occupy a predetermined position included in the game field L protected by the opponent player by the character 7 capable of being operated by the player. In this case, for example, when the character 7a of the player reaches a castle present in the predetermined region, the mobile terminal 100 determines the player as a winner.

On the other hand, the mobile terminal 100 may set another purpose for the battle game. For example, in the battle game, the purpose of the mobile terminal 100 may be to destroy plural buildings included in the game field L protected by the opponent player by the characters 7a capable of being operated by the player. In this case, the mobile terminal 100 may determine the player as the winner when a predetermined number of buildings are destroyed by the characters 7a of the player. Alternatively, the mobile terminal 100 may determine a player who has the largest number of regions 1 occupied by the character 7a and/or the largest number of destroyed buildings as the winner in the battle game. Further, in the battle game, the purpose of the mobile terminal 100 may be to defeat a specific character 7b (boss character) arranged in the game field L protected by the opponent player by the characters 7a capable of being operated by the player.

Further, the mobile terminal 100 may give a reward advantageous to the progress of the game to the player, as the character 7a capable of being operated by the player intrudes into a predetermined range in the game field L. For example, when the character 7a of the player intrudes into the region 1 set as a domain of the battle opponent, the mobile terminal 100 may enhance the parameters of the character 7a of the player and/or the selection object 6.

As described above, since the mobile terminal 100 requires the player to consider a strategy that reflects the overall game field in excess of a local combat result, it is possible to provide a game with high amusement and strategic flexibility.

Process Executed by Mobile Terminal 100

Figure 6:
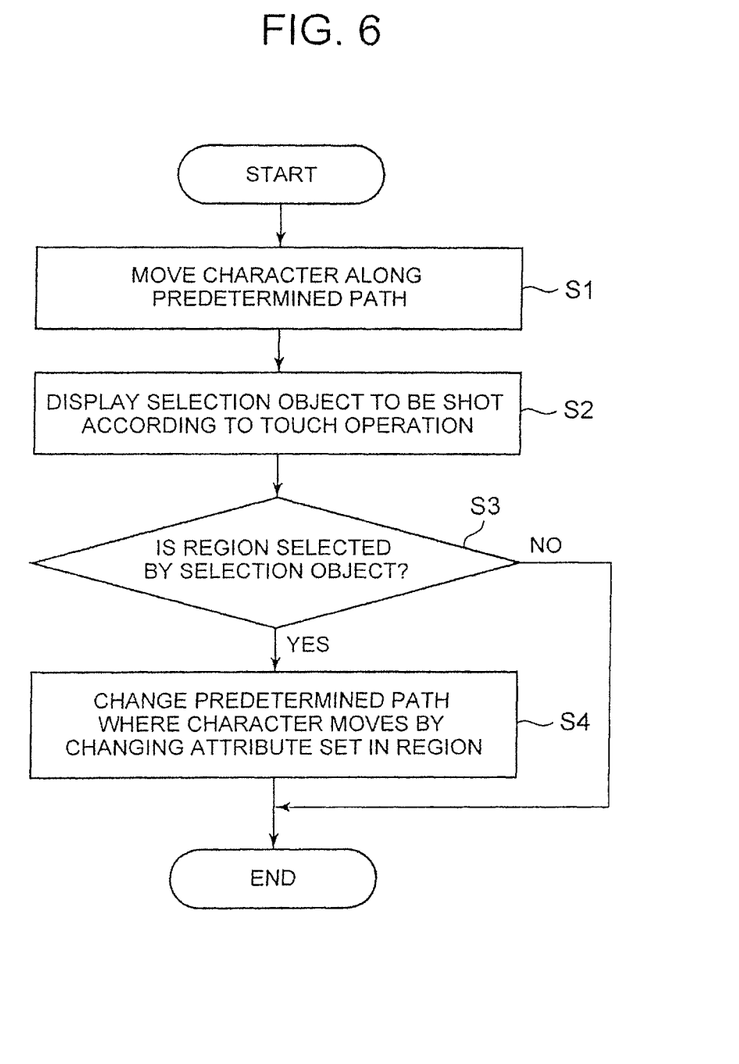
FIG. 6 is a flowchart illustrating an example of a process executed by the mobile terminal.

FIG. 6 is a flowchart illustrating an example of a process executed by the mobile terminal 100. In the following description, "steps" written in brackets represent respective steps included in a control method of a computer.

The character moving section 15 moves each character along a predetermined path in the game field L, which is a stage where the game is progressed (step 1, movement step, hereinafter, "step" is simply referred to as "S"). Then, the object display section 12 displays the selection object 6 in the display unit 50 so that the selection object 6 capable of selecting at least one of plural regions included in the game field L flies out, according to a touch operation detected by the input surface 41 (S2, first display step). Further, the attribute change section 13 determines whether at least one of the plural regions is selected by the selection object (S3). When at least one region is selected (YES in S3), the attribute change section 13 changes the attribute set in the region to change the predetermined path where the character moves (S4, change step).

The control method may arbitrarily include processes executed in the respective sections other than the character moving section 15, the object display section 12, and the attribute change section 13, in addition to the above-described processes described with reference to FIG. 5.

Effects of the Mobile Terminal 100

The mobile terminal 100 may change the predetermined path where the character 7 moves by flying out the selection object 6 according to the operation of the player to change the attribute set in the region l. That is, the mobile terminal 100 may indirectly operate the movement of the character 7 in the game field L by the selection object 6. Thus, the mobile terminal 100 can realize a game with high amusement and strategic flexibility.

Configuration in which Server 200 Provides a Part or all of Functions

Hereinbefore, a configuration is described in which a game program that processes the progress of the game using plural game mediums is mainly executed by the mobile terminal 100. On the other hand, a configuration may be used in which part of the game program or the entirety thereof is executed by the server 200 and a result of the executed process is returned to the mobile terminal 100. When the computer of this example functions as a server device (server 200) connected to a player terminal through a network, a hybrid game may be used in which the server device and the player terminal respectively perform a part of the processes. For example, a game progress screen may be displayed in the player terminal as a web display based on data generated by the server device, and other menu screens or the like may be displayed by a native application installed in the player terminal as a native display. Thus, when the mobile terminal 100 provides the functions, the server 200 obtains the same effects as the effects of the mobile terminal 100.

Realization Examples Based on Software

The control blocks (particularly, the control unit 10) of the mobile terminal 100 and the server 200 may be realized by a logical circuit (hardware) formed as an integrated circuit (IC chip) or the like, or may be realized by software using a central processing unit (CPU). In the latter case, the mobile terminal 100 and the server 200 include a CPU that executes a command of a game program which is software to realize each function, a read only memory (ROM) or a storage device (referred to as a "recording medium") in which the game program and a variety of data is recorded to be readable by a computer (or CPU), a random access memory (RAM) that develops the game program, and the like. Further, the computer (or CPU) reads the game program from the recording medium, and executes the game program to achieve the selected goal. As the recording medium, a "non-temporary tangible medium," for example, a tape, a disk, a card, a semiconductor memory, a programmable logical circuit or the like may be used. Further, the game program may be supplied to the computer through an arbitrary transmission medium (a communication network, broadcast waves or the like) capable of transmitting the game program. This disclosure may also be realized in a format of a data signal, embedded in a carrier, in which the game program is realized by electronic transmission.

Specifically, the game program may be a game program capable of processing the progress of a game using plural game mediums, and allows the computer (the mobile terminal 100 and the server 200) to execute a retrieving function, a first display function, a change function, a second display function, and a movement function.

The retrieving function, first display function, change function, second display function, and movement function may be realized by the above-described input retrieving section 11, object display section 12, attribute change section 13, field display section 14, and character moving section 15, respectively. Details thereof are as described above.

Further, the game program may be realized as a game program that processes the progress of a game using plural game mediums, which causes a computer to execute: a first display function of displaying a selection object capable of selecting at least one of plural regions included in a three-dimensional game field which is a stage where the game is progressed and has a width, a depth and a height so that the selection object flies out according to an operation detected by a certain input unit; a second display function of displaying the game field to be looked down on from a predetermined angle; and a retrieving function of retrieving at least one of a flying out strength, a flying out direction and a flying out angle of the selection object based on the operation, in which the first displaying function includes displaying the selection object so that the selection object flies out into the game field while drawing a locus determined according to at least one of the flying out strength, flying out direction and flying out angle retrieved by the retrieving function.

The game program may be installed using a script language such as ActionScript or JavaScript (Registered Trademark), an object-oriented programming language such as Objective-C or Java (Registered Trademark), a markup language such as HTML5 or the like. Further, a game system that includes an information processing terminal (for example, the mobile terminal 100) having respective parts that perform functions realized by the game program and a server having respective parts that realizes remaining functions different from the functions of the terminal is also included in the scope of this disclosure.

Supplementary Information

This disclosure is not limited to the above-described examples, and may be altered by those skilled in the art within the scope of the appended claims. An example obtained by appropriately combining technical means disclosed in different examples is included in the technical scope of this disclosure. Further, new technical features can be formed by combining technical aspects disclosed in the examples.

TECHNICAL APPLICABILITY

This disclosure can be widely applied to an arbitrary computer such as a smart-phone, a tablet terminal, a mobile phone, a home game machine, a personal computer, a server, a work station, or a main frame.

The invention claimed is:

1. A non-transitory computer-readable storage medium storing computer-readable instructions that, when executed by a computer, cause the computer to perform a game method comprising:
    moving a first game medium of a plurality of game mediums along a path in a game field including a plurality of regions;
    throwing a first object in the game field according to an operation by a first player;
    displaying a second object in a first region of the plurality of regions in response to selection of the first region by the first object, the second object being different from the first object; and
    changing a parameter of the first game medium associated with the first region.

2. The non-transitory computer-readable storage medium according to claim 1, wherein throwing the first object includes animating the first object to fly out to the first region in which the first object is displayed.

3. The non-transitory computer-readable storage medium according to claim 1, wherein the first game medium is present in the first region.

4. The non-transitory computer-readable storage medium according to claim 1, wherein changing the parameter of the first game medium includes changing the parameter of the first game medium when the first game medium passes through the first region after the second object is displayed in the first region.

5. The non-transitory computer-readable storage medium according to claim 1, wherein the parameter of the first game medium is continuously changed after the first game medium passes through the first region.

6. The non-transitory computer-readable storage medium according to claim 1, wherein the parameter includes at least one of a moving speed, a moving direction, a moving path, an offensive power, a physical strength and state information of the first game medium.

7. The non-transitory computer-readable storage medium according to claim 6, wherein the parameter includes the physical strength of the first game medium, and the physical strength of the first game medium is reduced when the second object is displayed.

8. The non-transitory computer-readable storage medium according to claim 6, wherein the parameter includes the moving speed of the first game medium, and the moving speed of the first game medium is reduced when the second object is displayed.

9. The non-transitory computer-readable storage medium according to claim 1, wherein an item that supports the first game medium is displayed when the second object is displayed.

10. The non-transitory computer-readable storage medium according to claim 1, wherein moving the first game medium along the path includes moving the first game medium according to an operation by a second player, the second player being different from the first player.

11. The non-transitory computer-readable storage medium according to claim 1, wherein throwing the first object in the game field includes throwing the first object according to at least one of a length or a direction input by the first player.

12. A method of controlling a computer to execute a game, comprising:

moving a first game medium of a plurality of game mediums along a path in a game field including a plurality of regions;
throwing a first object in the game field according to an operation by a first player;
displaying a second object in a first region of the plurality of regions in response to selection of the first region by the first object, the second object being different from the first object; and
changing a parameter of the first game medium associated with the first region.

13. A computer that executes a game program, comprising:
a display; and
circuitry configured to:
move a first game medium of a plurality of game mediums along a path in a game field including a plurality of regions;
throw a first object in the game field according to an operation by a first player;
display a second object on the display in a first region of the plurality of regions in response to selection of the first region by the first object, the second object being different from the first object; and
change a parameter of the first game medium associated with the first region.

* * * * *